Sept. 28, 1943.    A. T. GREGORY ET AL    2,330,779
AIR COOLED ENGINE CYLINDER
Filed July 24, 1940    3 Sheets-Sheet 1

INVENTORS
Alfred T. Gregory
and Chester C. De Ber
BY
Hoguet, Neary & Campbell
ATTORNEYS

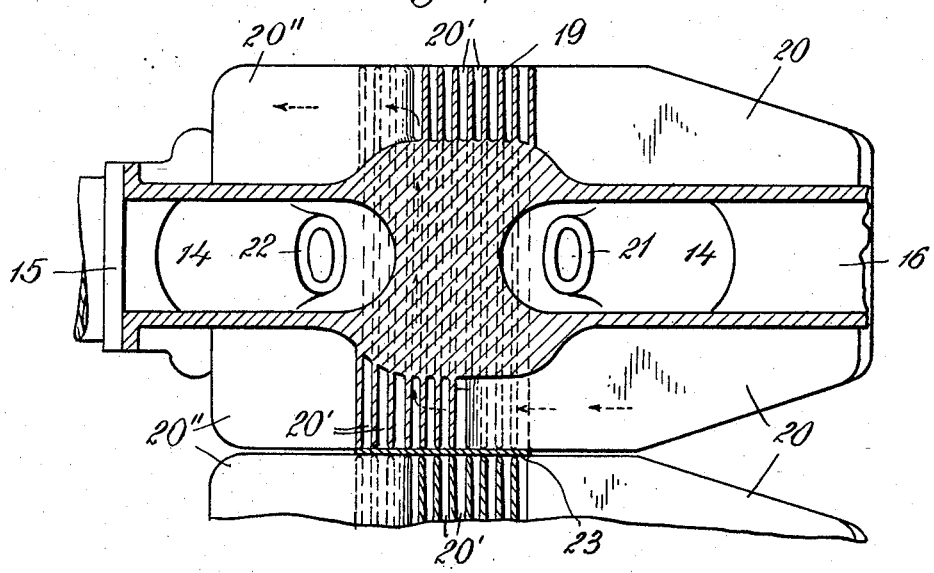
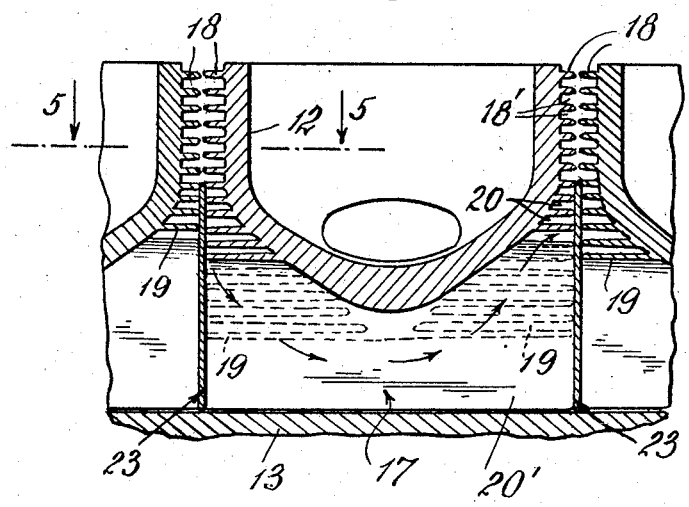

Sept. 28, 1943.  A. T. GREGORY ET AL  2,330,779
AIR COOLED ENGINE CYLINDER
Filed July 24, 1940  3 Sheets-Sheet 3
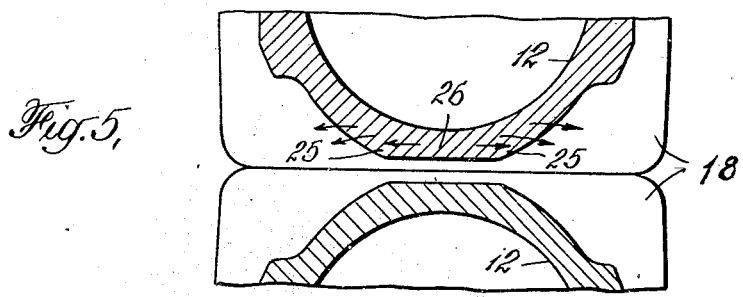
Fig. 5.
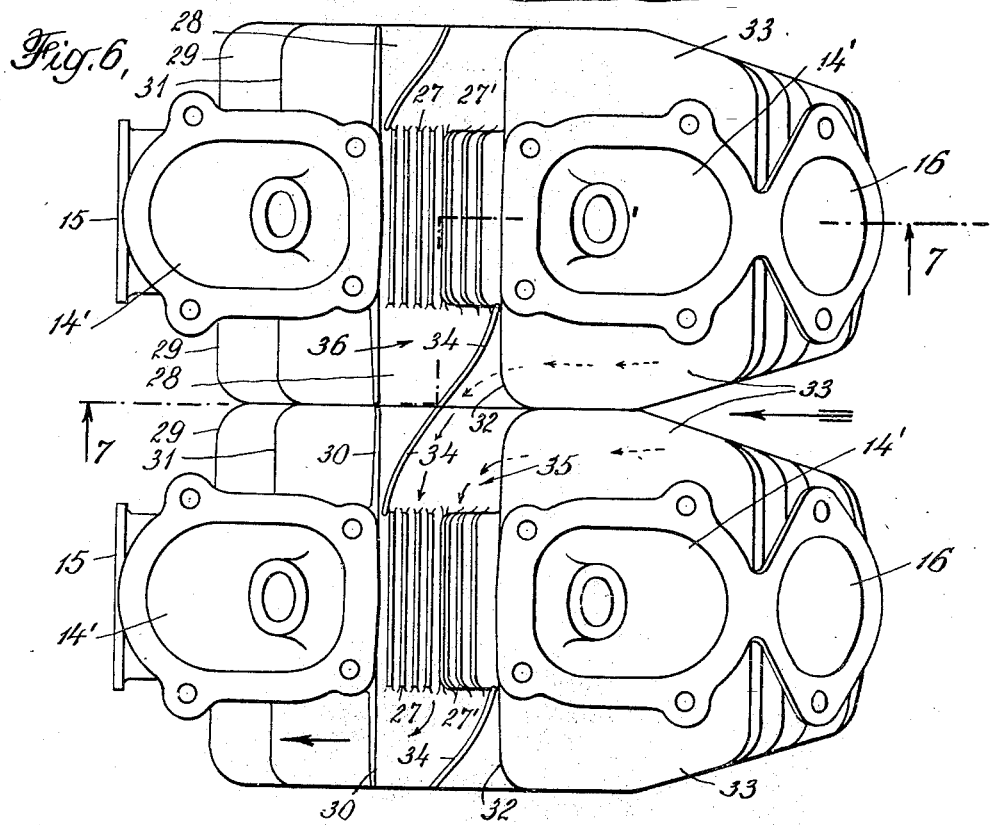
Fig. 6,
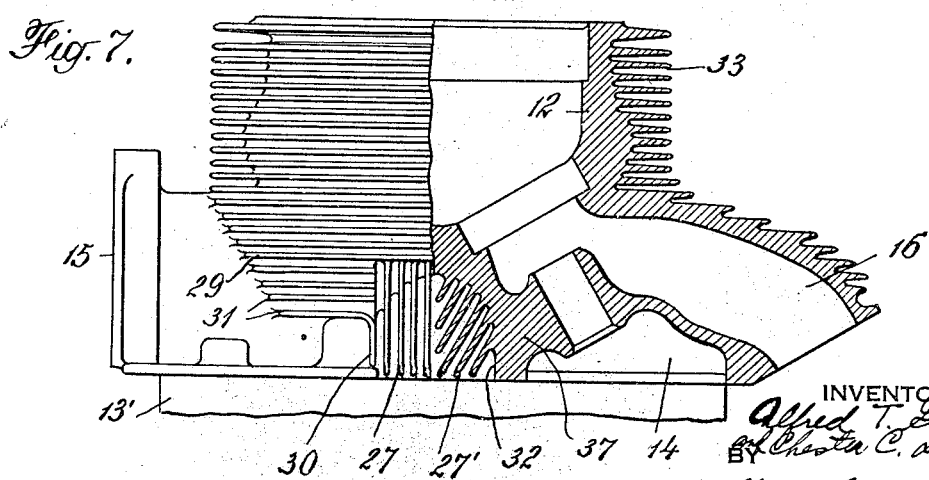
Fig. 7.
INVENTORS
Alfred T. Gregory
Chester C. old er
BY
Hoguet Neave & Campbell
ATTORNEYS Patented Sept. 28, 1943

2,330,779

UNITED STATES PATENT OFFICE 2,330,779

AIR-COOLED ENGINE CYLINDER

Alfred T. Gregory and Chester C. De Pew, Farmingdale, N. Y., assignors to Fairchild Engine and Airplane Corporation, Farmingdale, N. Y., a corporation of Maryland Application July 24, 1940, Serial No. 347,162

9 Claims. (Cl. 257—261)

This invention relates to air-cooled engines and has particular reference to a cylinder head construction for air-cooled aeronautical engines, although the invention is not limited to that use.

An object of the present invention is to provide a system for cooling the area of a cylinder head between the intake and exhaust valve housings of air-cooled aeronautical engines of in-line construction.

A further object of the invention is to provide a cylinder construction in which cooling air delivered to the intake side of air-cooled cylinders of in-line aeronautical engines is diverted across the head of the cylinder between the intake and exhaust housings in order to cool adequately this portion of the cylinder head.

Other objects of the invention will become apparent from the following description of typical forms of cylinder constructions embodying the present invention.

In accordance with the present invention, a cylinder head construction for air-cooled aeronautical engines is provided, wherein the finning is so arranged that a portion of the cooling air is positively led in a confined zig-zag path from one side of the engine or cylinder bank, first between certain of the lateral fins extending between adjacent cylinders normal to the axis of the cylinders, then between transverse fins extending across the ends of the cylinders parallel to the plane of the cylinder bank, and thence again between the lateral fins to the exhaust or lee side, so that the cylinder head top is as positively and effectively cooled as the remainder of the head and the cylinder barrels. These transverse fins are also so arranged that effective cooling of local areas is obtained, and the metal of the cylinder walls is so distributed that heat is conducted thereby to more remote fins of greater radiating area, and uniform cooling of the whole cylinder head is effected.

In a preferred embodiment of the invention adapted to a pressure air-cooled in-line aeronautical engine, the finning of the cylinder heads fills the inter-cylinder spaces and the spaces between the cylinder heads and the cam-shaft housing, or cowling, as the case may be, so that the cooling air, in passing from one side to the other of the bank of cylinders, must traverse the paths defined by the fins, baffles, and the cam-shaft housing or cowling.

In a modified form of the invention, the cooling fins along the sides of the cylinder wall conduct the air straight across the cylinder. One of these transverse fins, which is nearly tangent with the end of the cylinder, forms with the cam-shaft housing a chamber through which air flows to cool the valve ports and the end or center portion of the cylinder head.

In both forms of the invention, the metal of the cylinder wall is thickened adjacent the inter-cylinder spaces where the horizontal fins are short, due to small space requirements, and this thickened portion of the cylinder wall is so arranged as to conduct heat more rapidly from the short fin areas to those having fins of greater radiating surface, so that uniform cooling of the cylinder over each unit of area is obtained. Other improvements will become apparent as the description of the invention proceeds and it will be understood that for air-cooled engines other than the in-line types, the finning, while remaining generally the same, must be adapted to the structural peculiarities of those engines.

It will be seen that, unlike the usual free-radiating finning arrangements of air-cooled aeronautical engine cylinders, including the common transverse "pompadour" fins over the cylinder head, in the arrangement of this invention the cooling air is divided between the several cylinders and is positively directed in a plurality of confined paths of substantially tubular form defined by the fins of each cylinder, so as to obtain maximum cooling efficiency for a given quantity of air for the cylinder head between the valve housings and, if desired, for the spark plugs, without requiring additional air or equipment, or inordinately large fins for that purpose.

For a more complete understanding of the invention, reference may be had to the accompanying drawings, in which:

Fig. 3 is a transverse section through the cylinder head fins, as seen along the line 3—3 of Fig. 1;

Fig. 4 is an axial section through the cylinder head as seen along the line 4—4 of Fig. 1;

Fig. 5 is a fragmentary transverse section through adjacent cylinder walls as seen along the line 5—5 of Fig. 4, and illustrates the distribution of the cylinder wall metal to provide efficient heat flow;

Fig. 6 is a bottom view of two adjacent cylinders embodying a modified form of the finning arrangement of this invention; and Fig. 7 is a fragmentary section therethrough as seen along the line 7—7 of Fig. 6.

Figure 1:
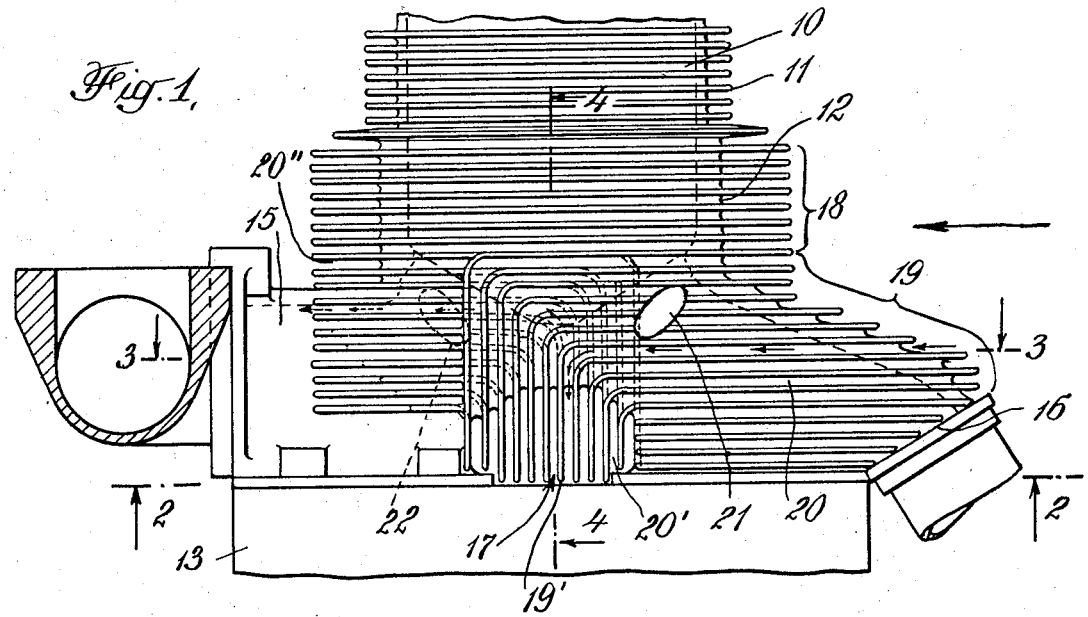
Figure 1 is an elevation of a cylinder head of an inverted vertical in-line, air-cooled aeronautical engine embodying the finning arrangement of this invention, as seen along the line 1—1 of Fig. 2.

Referring to Fig. 1 of the drawings, numeral 10 designates the barrel of a cylinder depending from the crankcase, not shown, of an inverted vertical in-line aeronautical engine, and provided with the usual horizontal radiating fins 11 extending normal to the axis of the cylinder. The cylinder head 12 connected to the barrel 10 is secured to the cam-shaft housing 13 containing the cam-shaft and the like, not shown, but of conventional construction. The valve stems and their springs, not shown, are enclosed in housings indicated at 14 in Figs. 2 and 3, and it will be observed that these housings 14, together with the intake and exhaust manifold connections 15 and 16, respectively, occupy much of the area of the top of the cylinder head 12, so that only the relatively small area 17 between housings 14 and at the sides in the inter-cylinder spaces is available for cooling purposes. Also, the housings 14 form obstructions to the flow of cooling air from one side of the cylinder bank to the other across the top of the cylinder head, so that the center area 17 is not directly flushed.

However, by proper distribution of the fins and the available cooling air in accordance with this invention, effective cooling of the cylinder head top is obtained. In the new arrangement, the horizontal fins 19 lying adjacent the cam-shaft housing 13 and forming passages 20 between them, do not extend uninterruptedly through from one side of the cylinder bank to the other, as do fins 18, but their horizontal course is interrupted and they are turned at substantially right angles to pass substantially parallel to the plane of the cylinder bank. Thus these fins 19' extend transversely over the top of the cylinder head through the space 17 between the housings 14 and parallel to the axis of the cylinder and are substantially vertical, as is shown particularly in Fig. 1.

It will be observed that the individual vertical fins 19' extend to, or practically to, the surface of the cam-shaft housing 13, thus forming a plurality of substantially tubular flat passages 20' bounded by adjacent fins 19', the top of the cylinder head 12 and the surface of the cam-shaft housing 13. It will be observed that although each transverse, vertically-extending passage 20' is a continuation of the corresponding intake passage 20 at one side of the cylinder bank, it does not discharge into a horizontally-extending passage 20'' at the same level as intake passage 20, but into one lying at a different level, as shown in Figs. 1 and 4. In this way, cooling air which traverses hot spots on the intake side of the cylinder bank is discharged at relatively cooler points at the discharge side of the cylinder bank, and vice versa.

Thus, among the hotter spots of the cylinder are the spark plugs, the openings of which are indicated at 21 and 22, the former being the port plug and the latter the lee lug. Inasmuch as the air traversing the port plug 21 is relatively cooler, being on the intake side, it is heated at the spark plug 21 but is discharged near cam-shaft housing 13, more remote from the cylinder head 12 and therefore in an area requiring less cooling. Likewise, relatively cooler air, taken in near the camshaft housing 13 on the port side and therefore not highly heated, still has considerable cooling effectiveness and therefore is led to the lee spark plug area at 22 to cool the same. In this way a thermal balance of the available cooling air for various parts of the cylinder head may be obtained and maintained.

Figure 2:
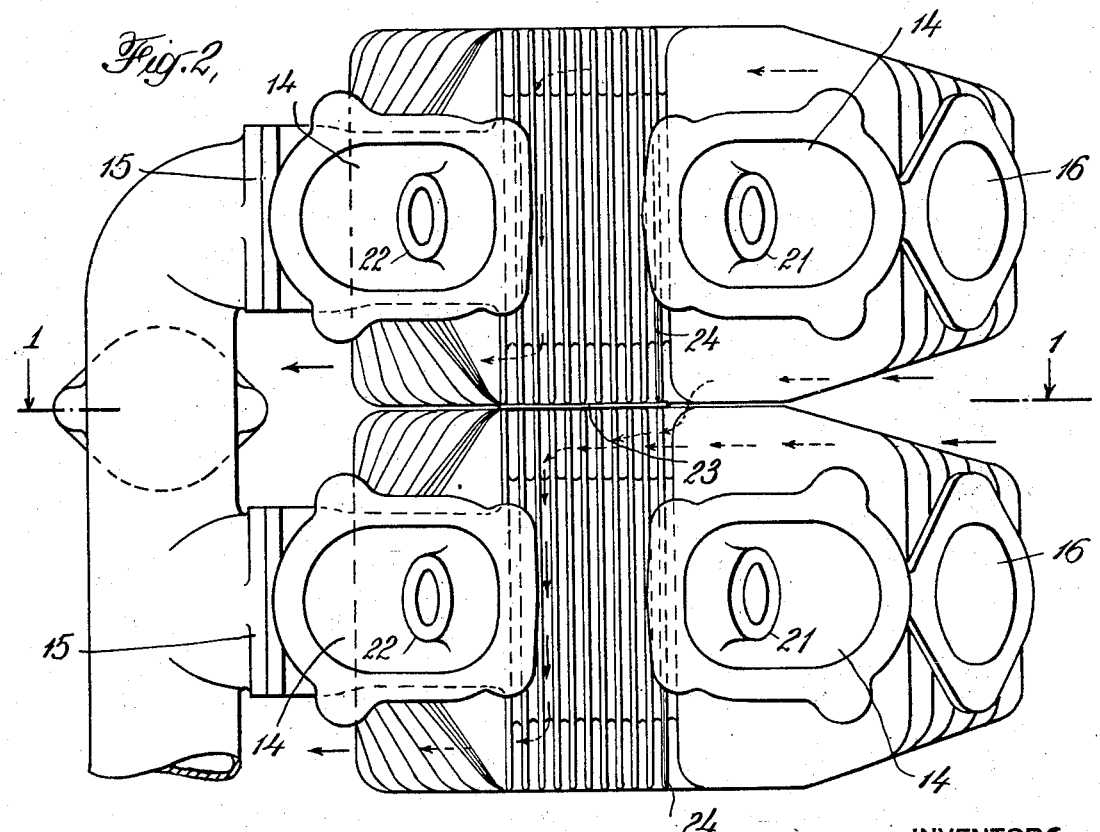
Fig. 2 is a bottom view of two adjacent cylinder heads embodying the present invention, as seen along the line 2—2 of Fig. 1.

In order to keep intact the air currents traversing the continuous passages 20, 20' and 20'' for the individual cylinders, the spaces 17 of adjacent cylinders are blocked off from each other by means of plates 23 inserted between the adjacent cylinders, as indicated in Figs. 2, 3 and 4. Similarly, in order to confine the intake air for fins 19 to the zig-zag course indicated in Fig. 2 by the arrows, as seen from below, the web 24 on the intake side of each cylinder is provided, this web substantially preventing the entry of opposed air currents. By means of plates 23 and webs 24, the cooling air is properly streamlined without substantial turbulence and confined to the general paths indicated by the arrows and thus the spent cooling air is carried off effectively, whether the cooling is carried on under static pressure from a pressure source, such as an air scoop on the port side directed in the direction of travel of the aeroplane and having an inlet area larger than the aggregate area of the discharge openings to the lee side, as described in Patent No. 2,152,043, issued March 28, 1939, to applicant Alfred T. Gregory, or by free air flow from the port side to the lee side of the cylinder bank.

As shown particularly in Figs. 4 and 5, those portions of the fins 18 between the walls of adjacent cylinders are short, due to limited space, and that consequently the radiation area at that point is not as great as elsewhere. In order to provide for the conduction of heat from this point, the cylinder wall 12 is thickened at 26, as shown in Fig. 5, so thus there is a greater cross section of metal to carry away the heat from the wall portion 26 to portions 25 having greater fin areas. Accordingly, the heat travels from portion 26 to portions 25 as indicated by the arrows in Fig. 5, so that portion 26 is adequately cooled, notwithstanding its small fin area.

In the modified form of the invention illustrated in Figs. 6 and 7, the transverse fins 27, extending parallel to the plane of the cylinder bank, do not traverse the entire width of the cylinder, as in the form of Figs. 1 and 2, but are confined to the center section between valve housings 14', as shown in Fig. 6. This arrangement leaves areas 28 devoid of fins, and these areas of adjacent cylinders communicate but are closed at the bottom by camshaft housing 13' and at the top by the horizontal fin 29, and are bounded at one side by the wall 30 formed by the downwardly turned edge of lower horizontal fin 31 and on the other side by the inner edges 32 of the horizontal fins 33. Thus, access to areas 28 is had between transverse fins 27 along the plane of the cylinder bank, and between the camshaft housing 13' and horizontal fin 29 through the spaces between the intervening horizontal fins 31 and 33.

Extending diagonally across the areas 28 of adjacent cylinders is a baffle 34, which divides the space into two expansion chambers, 35 and 36. The vertical dimension of the baffle 34 is substantially equal to the space between fin 29 and camshaft housing 13', so that cooling air, entering between the horizontal fins 33 in the direction indicated by the large arrow in Fig. 6, is diverted by baffle 34 into expansion chamber 35, then between the transverse fins 27 across the top of the cylinder into expansion chamber 36, and then to discharge between the horizontal fins 31, after being diverted upwardly by wall 30. In the expansion chambers 35 and 36 the air is allowed to expand in response to its increased heat content and also to equalize in pressure and temperature, and, as before, the air enters and leaves these expansion chambers through the confined tubular paths formed between the fins 33, 27 and 31. Efficient and uniform cooling of the cylinder heads is accordingly obtained.

As is shown in Fig. 7, certain of the transverse fins 27, namely, those designated 27', are inclined to the vertical and approximately normal to the inclined surface from which they rise. With this arrangement, a short and direct path of travel is provided for the heat from each unit of the cross-sectional area 37, whereby the latter is cooled more effectively without increase in the radiating area. Although the fins 27' are indicated in a specific location, it will be understood that the same principle of fin arrangement may be applied to other parts of the cylinder.

Although the embodiment of the invention illustrated and described herein has been directed to an inverted in-line engine, it is to be understood that the invention is applicable to all types of air-cooled engines and is otherwise susceptible to changes in form and detail within the scope of the appended claims.

We claim:

1. An air-cooled cylinder having axially spaced lateral radiating fins arranged at the air intake side of the engine substantially in the general direction of flow of the cooling air, spaced radiating fins extending transversely across the top of the cylinder from one side thereof to the other at an angle to the general direction of flow of the air and connected to said lateral fins to form substantially continuous open edged channels between them, lateral radiating fins on the cooling air discharge side of the cylinder and connected to said transverse fins to form extensions of said channels, and means closing the open edges of at least the channels between said transverse fins to cause the cooling air to flow from between the fins on said intake side across the top of the cylinder and rearwardly between the fins on the discharge side of said cylinder.

2. An air-cooled cylinder having spaced lateral radiating fins arranged at the air intake side of the engine substantially in the general direction of flow of the cooling air, spaced radiating fins extending transversely across the head of the cylinder from one side thereof to the other at an angle to the general direction of flow of the air and connected to said lateral fins to form substantially continuous open edged channels between them, means extending over the head of the cylinder and located at the opposite sides thereof for closing the open edges of the transverse channels to cause the cooling air to flow therethrough, and spaced radiating fins on the lee side of said cylinder extending substantially parallel to the fins on said air intake side connected to said transverse fins and forming channels for receiving air from said transverse channels for discharge at the lee side of said cylinder.

3. In an air-cooled bank of cylinders each provided with spaced abutments engaging a member forming with the tops of the cylinder a passage extending in a direction longitudinally of the bank, the combination of a plurality of spaced lateral radiating fins arranged at the cooling air intake side of the bank, and a plurality of spaced transverse radiating fins on each cylinder extending across said passage substantially into engagement with said member and in a direction substantially longitudinally of the bank and connected with said lateral fins to form continuous channels extending from the air intake side across the top of the cylinder, additional spaced lateral radiating fins on the lee side of said cylinders connected with said transverse fins and forming channels for discharging air from said transverse channels to the lee side of said bank, the said lateral fins at the intake side of adjacent cylinders being in registry and in substantial engagement to form closed channels, and means for diverting cooling air from the closed channels at the intake side into the transverse channels of one of the said adjacent cylinders and from said transverse channels into the channels at said discharge side.

4. In an air-cooled bank of cylinders each provided with spaced abutments engaging a member forming with the tops of the cylinders a passage extending in a direction longitudinally of the bank, the combination of spaced lateral radiating fins extending substantially normal to the axis of each cylinder at the air intake side of the bank, fins extending transversely over the top of each cylinder in the passage in a direction longitudinally of the bank, the lateral fins of adjacent cylinders being in registry and the transverse fins extending substantially to the member to form substantially closed air channels leading from the intake side of the bank and transversely across the top of each cylinder, and spaced fins on the lee side of said cylinders extending substantially normal to the axis of the cylinder on the air discharge side of the bank forming channels communicating with the channels extending across the top of each cylinder for receiving the cooling air from the said transverse channels, and means for diverting air from the closed channels between a pair of cylinders through the transverse channels on one of said cylinders and into the discharge channels at the opposite side of said one cylinder.

5. In an air-cooled bank of cylinders each provided with spaced abutments engaging a member forming with the tops of the cylinders a passage extending in a direction longitudinally of the bank, the combination of first spaced lateral radiating fins extending substantially normal to the axis of each cylinder at the air intake side of the bank and forming first lateral channels, fins passing transversely over the tops of each cylinder in the passage in a direction longitudinally of said passage and forming transverse channels, and second spaced lateral radiating fins extending substantially normal to the axis of the cylinder to form second lateral channels discharging on the lee side of the cylinder bank, at least certain of said second lateral channels being displaced axially of the cylinder from the first lateral channels discharging into the corresponding transverse channels, and means for diverting air entering the first lateral channels into said transverse channels on one of said cylinders and for diverting air from said transverse channels into said second lateral channels of said one cylinder.

6. In an air-cooled bank of cylinders each provided with spaced abutments engaging a member forming with the tops of the cylinders a passage extending in a direction longitudinally of the bank, the combination of first spaced lateral radiating fins extending substantially normal to the axis of each cylinder at the air intake side of the bank and forming first lateral channels, fins passing transversely over the tops of each cylinder in the passage in the direction of said passage and forming transverse channels, and second spaced lateral radiating fins extending substantially normal to the axis of the cylinder to form second lateral channels communicating with said transverse channels and discharging on the lee side of the cylinder bank, said transverse connecting fins being interrupted in said passage to provide at least one expansion chamber for the heated air, means for diverting air from said first lateral channels into the transverse channels of one of said cylinders and from said transverse channels into the second lateral channels on the opposite side of said one cylinder.

7. In an air-cooled bank of cylinders each provided with spaced abutments engaging a member forming with the tops of the cylinders a passage extending in a direction longitudinally of the bank, the combination of spaced lateral radiating fins extending substantially normal to the axis of each cylinder and forming air passages from one side of the bank to the other, said fins being interrupted by a transverse passage extending across the tops of the cylinder in a direction longitudinally of the bank, spaced transverse radiating fins in said passage extending in a direction longitudinally of the bank and also extending to said member to form substantially closed transverse passages across the top of the cylinder, the ends of said transverse fins terminating short of the opposite sides of each cylinder for providing a space between the ends of the transverse fins of adjacent cylinders, and a diagonal baffle in said space for diverting cooling air entering said space into the passages formed between the said transverse fins and for dividing said space into two expansion chambers for the heated air.

8. In an air cooled bank of cylinders, each provided with spaced abutments engaging a member forming with the tops of the cylinders a passage extending in a direction longitudinally of the bank; the combination of a plurality of spaced laterally extending radiating fins extending substantially normal to the axis of at least two adjacent cylinders at the intake side of the bank, then transversely over the top of each said cylinder longitudinally of the bank and substantially parallel to the axis of the cylinder, then rearwardly to the lee side of said bank substantially normal to the axis of the cylinder, the fins on the intake and lee sides of said adjacent cylinders being in register, and means interposed between the edges of the portions of the fins extending across the tops of said adjacent cylinders to form continuous air channels leading from the intake side of the bank across the top of each said cylinder and rearwardly to the lee side of said bank.

9. An air-cooled cylinder having axially spaced lateral radiating fins arranged at the air intake side of the cylinder and extending substantially in the general direction of flow of the cooling air and forming channels therebetween for passage of cooling air, spaced radiating fins extending transversely across the head of the cylinder at an angle to the general direction of flow of the air and forming transverse channels therebetween for passage of cooling air, said transverse channels communicating at one end with the first-mentioned channels, other lateral radiating fins at the air discharge side of said cylinders extending in the general direction of flow of the air and forming channels communicating with said transverse channels for receiving air flowing therethrough and discharging said air at the discharge side of said cylinders, means closing the open edges of at least a portion of the channels between said transverse fins, and means for diverting cooling air from said first-mentioned channels into said transverse channels and for diverting air from said transverse channels into said air discharge channels.

ALFRED T. GREGORY.
CHESTER C. DE PEW.